Dec. 12, 1950  C. W. WALZ ET AL  2,533,542
DETACHABLE TRACTOR MOUNTED IMPLEMENT
Filed Nov. 15, 1944
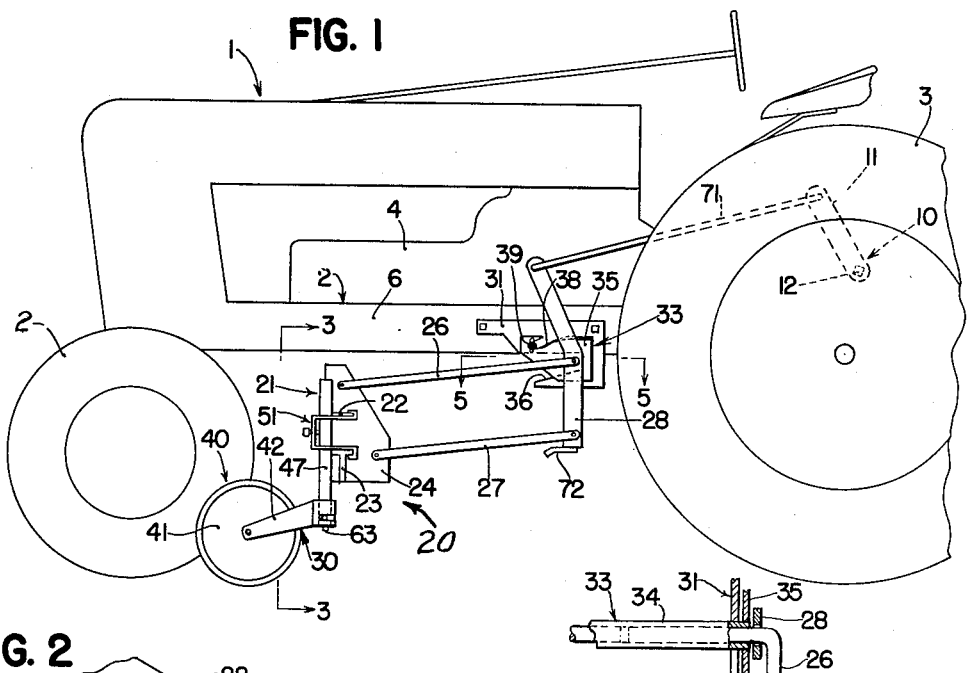
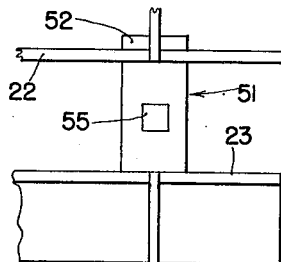
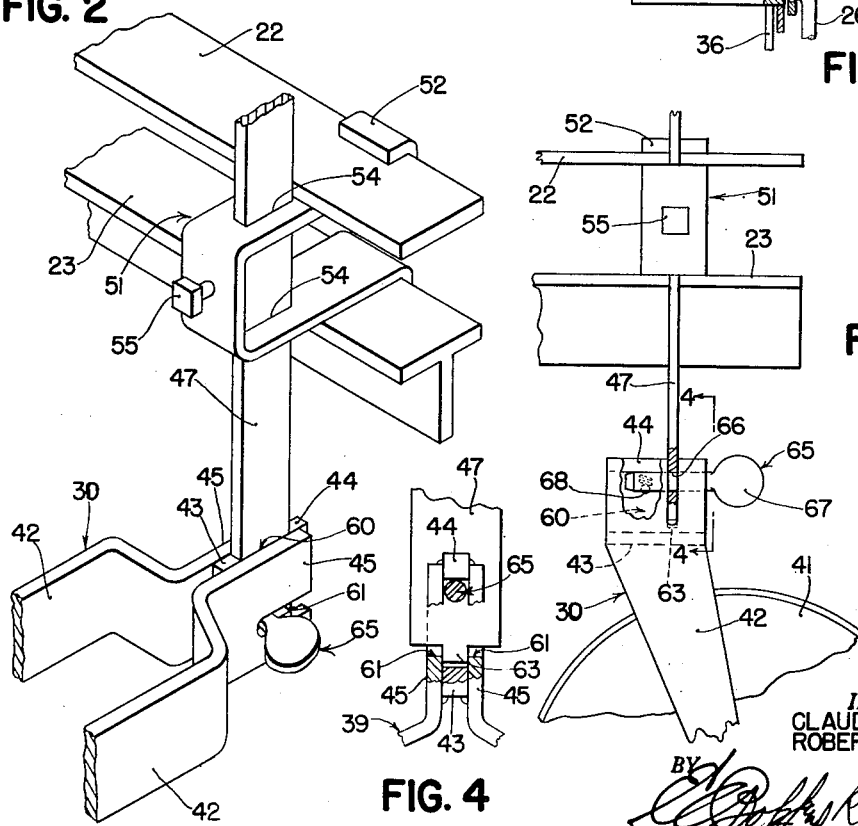
INVENTORS
CLAUDE WALZ
ROBERT D. GRIFF
ATTORNEYS Patented Dec. 12, 1950

2,533,542

UNITED STATES PATENT OFFICE 2,533,542

DETACHABLE TRACTOR MOUNTED IMPLEMENT

Claude W. Walz and Robert D. Griff, Rock Island, Ill., assignors to Deere & Company, Moline, Ill., a corporation of Illinois Application November 15, 1944, Serial No. 563,543

8 Claims. (Cl. 97—47)

The present invention relates generally to agricultural implements and more particularly to tractor mounted implements of the integral type.

The object and general nature of the present invention is the provision of a tractor mounted implement particularly constructed and arranged for quick attachment to and detachment from the tractor. More particularly, it is a feature of the present invention to provide means for facilitating the movement of a fairly long transversely arranged implement toward and away from its connected position with the tractor by transverse movement relative to the tractor. More particularly, according to the principles of the present invention, a special mounting for the gauge wheels is utilized for readily changing the gauge wheels into a position accommodating the lateral movement of the implement into and out of position with respect to the tractor, particularly underneath the central portion of the tractor. Specifically, it is a feature of this invention to provide a new and improved gauge wheel mounting which by merely removing a quick detachable pin and shifting the gauge wheel yoke into a different position on the standard to which the gauge wheel is connected, the implement may, after being detached from the tractor, be readily shifted laterally away from the tractor to complete the disconnection of the implement therefrom. Also, with the gauge wheels in the latter mentioned position, it is a relatively simple matter to roll the implement transversely of the tractor into a position underneath the same, ready for attachment to the sides of the tractor, and then by turning the gauge wheels and the gauge wheel yokes into their operating position and reconnecting the yokes to the implement frame in their new position, the implement is readily made ready for normal operation.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a side view of a tractor mounted implement in which the principles of the present invention have been incorporated.

Figure 2 is an enlarged perspective, showing the details of the gauge wheel connecting means, the parts being arranged in the positions they occupy in the normal or operating position of the gauge wheels.

Figure 3 is a view, taken generally along the line 3—3 of Figure 1, showing the gauge wheels in their transverse position, accommodating the support and movement of the implement transversely of the tractor into and out of its attaching position.

Figure 4 is a sectional view taken generally along the line 4—4 of Figure 3.

Figure 5 is a detail view, taken generally along the line 5—5 of Figure 1.

The tractor to which the implement is attached is indicated in its entirety by the reference numeral 1 and comprises a frame 2 carried on front and rear wheels 3 the rear wheels deriving propelling power from the motor 4 of the tractor. The tractor frame 2 includes side bars 6 to which attaching plates 31 are fixed, each attaching plate 31 having a forwardly facing notch 36, which will be referred to below. The tractor 1 includes power lift mechanism 10, which may be similar to the power lift shown in the United States patent issued February 8, 1938, to E. McCormick et al., No. 2,107,760, and which includes one or more power lift arms 11 actuated by power derived from the tractor motor 4 for rocking movement about the axis of the power lift rockshaft 12, the arms 11 properly being fixed to the power lift rockshaft 12 and movable therewith through a given range from raised to lowered position.

The implement which is constructed according to the principles of the present invention is indicated in its entirety by the reference numeral 20 and comprises a frame 21 including upper and lower transverse bars 22 and 23 connected together by frame plates 24 to which the bars 22 and 23 may be welded or otherwise fixed. The bars 22 and 23 form means to which one or more ground working tools (not shown) may be fixed. The plates 24 are apertured to receive the forward ends of pairs of upper and lower links 26 and 27, the rear ends of which are pivotally connected to arms 28. By virtue of this construction the implement frame 21 is capable of free floating movement with respect to the arms 28 and the links 26 and 27 are generally parallel, whereby the operating position of the tools is not changed when the frame 21 moves upwardly or downwardly with respect to the tractor to which it is attached by the vertically swingable links. The arms 28 are adapted to be connected to the tractor 1 by a quick detachable connection which includes a pair of implement-receiving plates 31 secured to and normally forming a more or less prominent part of the tractor and an attaching member 33 which may take any suitable form but preferably consists of a pipe member 34 and a pair of plates 35 secured to the ends of the pipe member 34. The upper links 26 each have their inner ends bent so as to extend into the piper member 34 which thereby serves as a pivot for the links 26. The tractor plates 31 are provided with tapered slots 36 which are adapted to receive the pipe member 34 of the attaching member 33, and each of the plates 35 is formed with a slot 38 which flares outwardly and faces rearwardly to receive a stud 39 that is formed on the associated tractor plate 31. A wing nut or other suitable means is provided for each stud 39 to secure the plates 35 of the attaching member 33 in place when the implement is in a position to be connected to the tractor, as will be described in more detail below.

The implement 20 is provided with a pair of gauge wheel units 40, one at each end of the implement, and since these gauge wheel units 40 are alike, only one is shown in detail. Each gauge wheel unit 40 includes a gauge wheel 41 mounted on suitable bearings in a yoke 30 comprising a pair of gauge wheel yoke arms 42. These arms have their rear ends bent inwardly and secured together, as by welding, through a pair of spaced apart blocks 43 and 44, the rear end sections 45 of the yoke arms being welded to the blocks which space them apart a distance to form a slot receiving the lower end of an attaching shank 47. The shank 47 is similar to shanks which commonly are provided for securing tools and the like to the frame bars 22 and 23, each shank being secured to the bars 22 and 23 by means of a clip 51 comprising a U-shaped member having ends 52 adapted to hook over the rear edges of the bars 22 and 23 and an intermediate portion, slotted at 54, to receive the standard 47 and tapped to receive a set screw 55 which, when tightened, serves to clamp the standard 47 in the clip 51 and to fixedly secure the latter to the implement frame bars 22 and 23

The normal operating position for the gauge wheels 40 is shown in Figure 1, where the tool has been illustrated as attached to the tractor and the wheels 41 in a position to roll forwardly. According to the principles of the present invention, however, the implement 21 is removed from and attached to the tractor by shifting the implement laterally, transversely of the tractor, into and out of a position underneath the tractor. To facilitate this attaching and detaching, we have provided an arrangement for attaching the gauge wheel units to the implement so as to accommodate readily changing the gauge wheel units 40 from a forward rolling position to a transverse rolling position. To this end, we form the rear portion of the gauge wheel yoke 30 in a particular way. Mention above was made to a slot, indicated in Figure 2 by the reference numeral 60, for receiving the lower end of the attaching standard when the associated gauge wheel is to be fixed to the implement in a forward rolling position. This slot 60 extends through the rear portion of the gauge wheel yoke 30 and is disposed substantially in the plane of the associated wheel 41. A second slot or notch 61 is formed in the rear portion of the gauge wheel yoke 30 and is disposed in a plane normal to the plane of the slot 60. The lower end of the tool shank 47 receiving the gauge wheel yoke 30 is formed with a downwardly extending lug 63 the width of which, in the plane of the standard 47, is substantially the same as the lateral dimension of the slot 60; in other words, the slot 60 is substantially the same area in cross section as the cross section of the standard 47, as shown in Figure 2, and extends all the way through the gauge wheel yoke 30. The other slot 61 is of similar configuration, being in the nature of a notch cut lengthwise into the intermediate portion of the gauge wheel yoke 30 and having a width equal to the thickness of the standard 47.

Figure 2 illustrates the position of the parts when the implement is in its normal operating position, as does also Figure 1. In this position it will be seen that the lower end of the standard 47 is disposed in the slot 60 and that a quick detachable pin 65 is inserted in the transverse slot 61 and through an opening 66 formed in the lower end of the standard 47. As best shown in Figure 3, the quick detachable pin 65 is provided with a handle section 67 and is readily inserted and removed. The pin 65 is provided with a ball detent 68 which serves to prevent the inadvertent or accidental displacement of the pin 65.

When it is desired to remove the implement 21 from the tractor 1, the link 71 connecting the arm 28 with the power lift arm 11 is disconnected, and then the wing nuts (on studs 39) holding the plates 35 to the tractor attaching plates 31 are removed. The tractor 1 is then backed a distance sufficient to disengage the attaching member 33 from the studs 39 and the slots 36. The member 33 then drops to the ground. Next, each of the gauge wheel units 40 is disconnected from its standard 47 by pulling out the associated pin 65, and then each gauge wheel unit is reconnected to the lower end of the associated standard 47 in a position with the wheels 41 in a transverse vertical plane. This is done by reconnecting each gauge wheel yoke 30 by swinging the yoke 30 around into a vertical position so that the lower end of the standard 47 enters the slot 61 with the lug 63 extending just below the bottom of the slot 61 and so interlocked between the sides 45 of the yoke pieces 42. This prevents the yokes 30 from tipping sideways. Then the pin 65 is inserted through the slot 60 and reinserted in the opening 66 in the standard 47. This securely holds each gauge wheel unit 40 in its new position so that the gauge wheels support the major portion of the weight of the implement 21 and facilitates its movement out from underneath the tractor laterally of the latter. A stop arm 72 may be fixed to the lower end of each of the arms 28 and is spaced below the link 27 a distance sufficient to accommodate all floating action of the implement during normal use, but when the power lift 10 is actuated to rock the arm 11 rearwardly to raise the implement, the resulting swinging of the arms 28 about the transverse axis defined by the inner ends of the links 26 and the pipe member 34 receiving them, causes the stops 72 to come up against the lower edges of the associated links 27 and so raise the implement into a transport position.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A tractor mounted implement adapted to be applied to and removed from the tractor by shifting the implement laterally to and from a position underneath the central portion of the tractor and extending transversely thereof, said implement comprising a transverse frame, a pair of implement receiving members adapted to be connected underneath the tractor to the opposite sides thereof, an attaching member, generally parallel links connected at one end with said implement frame, a part rockably mounted on said attaching member, means for connecting the other ends of said links with said part, means for limiting the movement of said links relative to said part, and means for rocking the latter.

2. A tractor mounted implement adapted to be applied to and removed from the tractor by shifting the implement laterally to and from a position underneath the central portion of the tractor and extending transversely thereof, said implement comprising a transverse frame, a pair of implement-receiving members adapted to be connected underneath the tractor to the opposite sides thereof, an attaching member, generally parallel links connecting said attaching member with said implement frame, and quick detachable means for connecting said attaching member to said implement-receiving members on the tractor, said attaching member comprising a pair of spaced parts receiving said quick detachable means and a pipe member rigidly secured to said parts and holding them at the desired spacing, the ends of said pipe member being open and receiving the ends of certain of said links.

3. A tractor mounted implement adapted to be detachably connected with a tractor and comprising a transverse frame, a pair of implement-receiving members adapted to be connected underneath the tractor to the opposite sides thereof, an attaching member comprising a pair of spaced members and a transverse part connected adjacent its ends thereto, link means pivotally connected with said part for connecting said attaching member with the transverse frame, and means for connecting said attaching member to said implement-receiving members.

4. A tractor mounted implement adapted to be detachably connected with a tractor and comprising a transverse frame, a pair of implement-receiving members adapted to be connected underneath the tractor to the opposite sides thereof, an attaching member comprising a pair of spaced parts and a pipe member fixed to said parts for holding them in spaced relation, the ends of said pipe member being open, quick detachable means for connecting said attaching member to said implement-receiving members, and link means connecting the attaching member to the implement, the ends of said pipe member receiving certain of said link means.

5. In a tractor mounted implement adapted to be mounted on an attaching member comprising a transverse part and plates connected to the ends of said part, means on the tractor for receiving and supporting said part, means on the tractor and acting against said plates for connecting said attaching member to the tractor, a pair of arms pivotally carried on said attaching member, a pair of links connected with each of said arms, and means for connecting the implement to said pairs of links, 6. A tractor mounted implement comprising a tool frame adapted to be disposed generally underneath the tractor, generally upwardly extending brackets connected with said tool frame, an attaching member disposed transversely on the underside of the tractor and adapted to be fixed thereto, said attaching member including generally downwardly extending pivoted arms, forwardly extending link means extending from said arms to said implement brackets, quick attachable means for connecting said attaching member to the tractor, and means for swinging said arms.

7. A tractor mounted implement comprising a tool frame, generally forwardly disposed gauge wheels connected therewith, brackets mounted in a vertical position and carried by said tool frame, an attaching member disposed transversely on the underside of the tractor and adapted to be fixed to the latter, swingable arms mounted on said attaching member, pairs of parallel links connecting said arms with said implement brackets, movement of said swinging arms through one range of movement acting through said links and reacting through said gauge wheels for raising and lowering said tool frame, and means for limiting movement between said links and said arms whereby movement of the latter through another range of movement serves to raise said implement tool frame relative to the tractor.

8. A tractor mounted implement adapted to be applied to and removed from the tractor by shifting the implement laterally to and from a position underneath the central portion of the tractor and extending transversely thereof, said implement comprising a transverse frame, a pair of implement-receiving members adapted to be connected underneath the tractor to the opposite sides thereof, an attaching member, generally parallel links connecting said attaching member with said implement frame, and quick detachable means for connecting said attaching member to said implement-receiving members on the tractor, said attaching member comprising a pair of spaced parts receiving said quick detachable means and a member rigidly secured to said parts and holding them at the desired spacing.

CLAUDE W. WALZ.
ROBERT D. GRIFF.

REFERENCES CITED

The following references are of record in the file of this patent:

UNITED STATES PATENTS

| Number | Name | Date |
| --- | --- | --- |
| 1,229,157 | Simoneaux | June 5, 1917 |
| 1,353,924 | Lucas | Sept. 28, 1920 |
| 1,536,591 | Kirkpatrick et al. | May 5, 1925 |
| 1,962,349 | Johnson | June 12, 1934 |
| 2,150,665 | Tuft | Mar. 14, 1939 |
| 2,127,579 | Altgelt | Aug. 23, 1938 |
| 2,239,332 | Mee | Apr. 22, 1941 |
| 2,368,156 | Orelind | Jan. 30, 1945 |
| 2,420,551 | Morkoski | May 13, 1947 |
| 2,426,529 | Silver | Aug. 26, 1947 |